United States Patent
Takabayashi

(12)
(10) Patent No.: US 7,150,148 B2
(45) Date of Patent: Dec. 19, 2006

(54) THRUST RECEIVING STRUCTURE OF TORQUE CONVERTER COVER

(75) Inventor: Masatoshi Takabayashi, Shizuoka-ken (JP)

(73) Assignee: Kabushiki Kaisha Yutaka Giken, Shizuoka (JP)

( * ) Notice: Subject to any disclaimer, the term of this patent is extended or adjusted under 35 U.S.C. 154(b) by 951 days.

(21) Appl. No.: 10/125,467

(22) Filed: Apr. 19, 2002

(65) Prior Publication Data

US 2002/0153222 A1    Oct. 24, 2002

(30) Foreign Application Priority Data

Apr. 23, 2001 (JP) .............................. 2001-124541

(51) Int. Cl.
  *F16D 33/18* (2006.01)
  *F01D 25/16* (2006.01)
(52) U.S. Cl. .................. 60/364; 60/366; 415/107; 415/229; 416/174; 416/197 C
(58) Field of Classification Search .................. 60/330, 60/364, 366, 367; 415/104, 107, 229; 416/174, 416/180, 197 C
See application file for complete search history.

(56) References Cited

U.S. PATENT DOCUMENTS

| | | | | | |
|---|---|---|---|---|---|
| 2,745,354 | A | * | 5/1956 | English et al. ................. | 60/367 |
| 2,801,521 | A | * | 8/1957 | Jandasek ...................... | 60/367 |
| 3,101,672 | A | * | 8/1963 | Peras .......................... | 416/180 |
| 3,316,622 | A | * | 5/1967 | Jandasek ................. | 416/197 C |
| 3,473,327 | A | * | 10/1969 | Szodfridt ...................... | 60/367 |
| 3,545,883 | A | * | 12/1970 | Iijima .......................... | 60/367 |
| 5,771,691 | A | * | 6/1998 | Kirkwood et al. ............ | 60/366 |
| 6,391,728 | B1 | * | 5/2002 | Yu .......................... | 416/197 C |

FOREIGN PATENT DOCUMENTS

| JP | 8-4875 | 1/1996 |
|---|---|---|
| JP | 11-82675 | 3/1999 |

* cited by examiner

Primary Examiner—Edward K. Look
Assistant Examiner—Michael Leslie
(74) Attorney, Agent, or Firm—Arent Fox PLLC

(57) ABSTRACT

A front cover 5 of a converter cover 4 is formed with a punched hole 12, a thrust bearing 13 having the same outer shape as that of the punched hole 12 is fitted to the punched hole 12, a bearing housing 14 is fitted to the outside, thereby tightly closing the converter cover 4 to support the thrust bearing 13. A thrust applied from a turbine hub 9 to the thrust bearing 13 is received by a flange 14*b* of the bearing housing 14.

3 Claims, 3 Drawing Sheets

THRUST RECEIVING STRUCTURE OF TORQUE CONVERTER COVER

BACKGROUND OF THE INVENTION

1. Field of the Invention

The present invention relates to a thrust receiving structure of a torque converter to be used in a transmission of a vehicle.

2. Description of the Prior Art

FIG. 4 shows a thrust receiving structure of a conventional torque converter, wherein a symbol "a" represents a front cover of the torque converter, and a symbol b represents a turbine hub. Torque is transmitted to an input shaft c of an automatic transmission from the turbine hub b, and the thrust generated in the turbine hub b is received by a thrust bearing d. In this structure, a bearing housing e is integrally formed on the front cover "a" by presswork, and its entrance is formed with a recess by cutting work. The thrust bearing d is to be fitted into the recess, and this thrust bearing serves as a thrust bearing accommodating portion f. Since an outer wall f1 of the thrust bearing accommodating portion f becomes thin due to the cutting work, there is a problem that the strength of this portion is lowered and the costs are increased due to the cutting work.

There is a known method for forming the recess by presswork (Japanese Patent Applications Laid-open Nos. 8-4875 and 11-82675), however, even if the recess is formed in this manner, the thickness of the plate is inevitably reduced, and if thickening press is carried out so as to compensate the reduced plate thickness, the number of presswork is increased, which increases the costs.

SUMMARY OF THE INVENTION

It is a main object of the present invention to make it possible to produce a thrust bearing accommodating portion at a center of a front cover without lowering the strength and with out using means which needs effort, and it is a secondary object of the invention to accommodate a thrust bearing in the thrust bearing accommodating portion such that the thrust bearing does not rotate together with a shaft.

To solve the main object, according to a first aspect of the invention, there is provided a thrust receiving structure of a torque converter cover in which an input shaft of an automatic transmission is disposed on a center of a torque converter, a front cover of a converter cover is provided with a thrust bearing, a thrust of a turbine hub fitted to the input shaft is supported by the thrust bearing, wherein a center of the front cover is formed with a punched hole, the punched hole is covered with a bearing housing comprising a cap and a flange, an outer periphery of the flange is welded to an outer surface of the front cover, a thrust bearing provided at its central portion with an insertion hole for the input shaft is fitted into the punched hole, a side surface of this thrust bearing is abutted against an inner surface of the flange, a tip end of the input shaft is inserted into the cap, an end surface of the turbine hub fitted to the input shaft is supported by the thrust bearing.

According to the first aspect, since it is only necessary to weld the bearing housing which is independent from the front cover to the front cover and thus, the processing is easy. The strength not only of the bearing housing but also of the front cover can be increased by increasing the strength of the bearing housing.

To solve the secondary object, according to a second aspect of the invention, there is provided a thrust receiving structure of a torque converter cover in which an input shaft of an automatic transmission is disposed on a center of a torque converter, a front cover of a converter cover is provided with a thrust bearing, a thrust of a turbine hub fitted to the input shaft is supported by the thrust bearing, wherein a center of the front cover is formed with a noncircular punched hole, the punched hole is covered with a bearing housing comprising a cap and a flange, an outer periphery of the flange is welded to an outer surface of the front cover, a thrust bearing which is provided at its central portion with an insertion hole for the input shaft and which has noncircular outer periphery is fitted into the punched hole, a side surface of this thrust bearing is abutted against an inner surface of the flange, a tip end of the input shaft is inserted into the cap, an end surface of the turbine hub fitted to the input shaft is supported by the thrust bearing.

According to the second aspect, since it is only necessary to weld the bearing housing which is independent from the front cover to the front cover and thus, the processing is easy. The strength not only of the bearing housing but also of the front cover can be increased by increasing the strength of the bearing housing. Further, force for rotating the thrust bearing is prevented by fitting the noncircular portions of the punched hole and the outer periphery of the thrust bearing to each other.

DESCRIPTION OF THE PREFERRED EMBODIMENT

Figure 1:
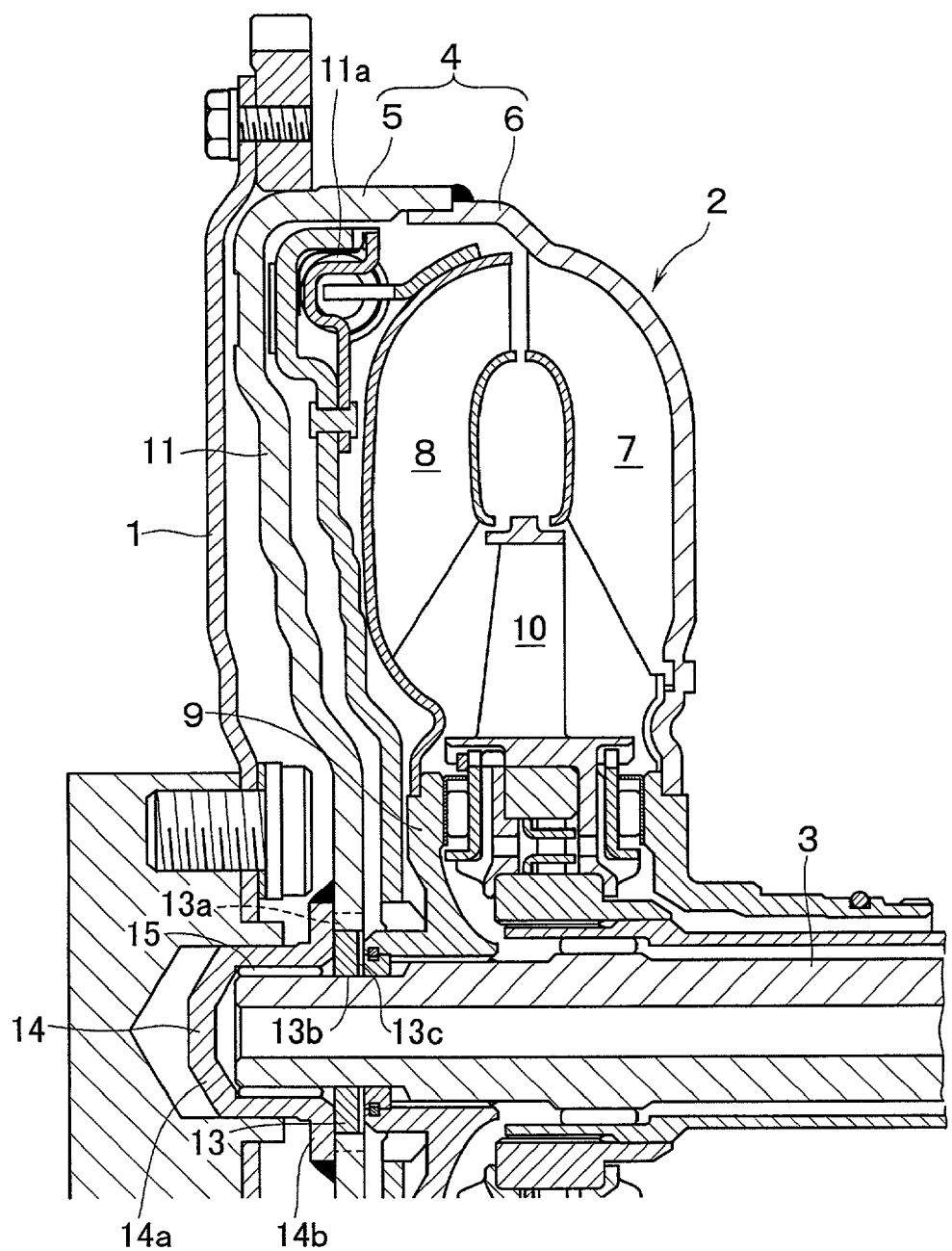
FIG. 1 is a vertical sectional view of an embodiment of the present invention.

An embodiment of the present invention will be explained with reference to the drawings below. In FIG. 1, a reference numeral 1 represents a drive plate driven by an engine (not shown), a reference numeral 2 represents a torque converter, a reference numeral 3 represents an input shaft of an automatic transmission driven by the torque converter. A converter cover 4 comprises a front cover 5 and a rear cover 6. The rear cover 6 is formed with blades 7. A turbine 8 is connected to a turbine hub 9 which is spline connected to the input shaft 3. A reference numeral 10 represents a conventionally known stator, a reference numeral 11 represents a conventionally known lockup piston and a reference numeral 11a represents a conventionally known shock absorber.

Figure 2A:
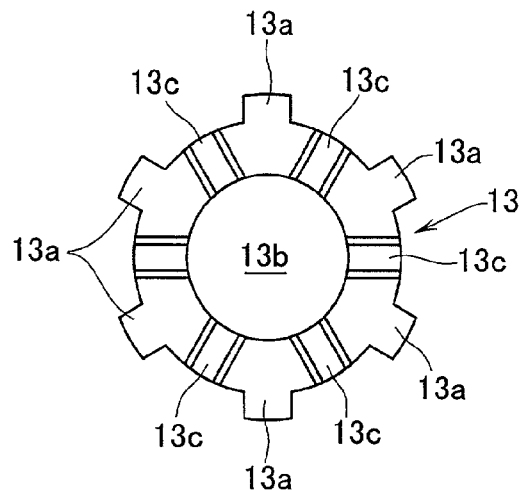
FIGS. 2A, 2B and 2C are a front view, a vertical sectional view and a partial sectional view of a thrust bearing.
Figure 2B:
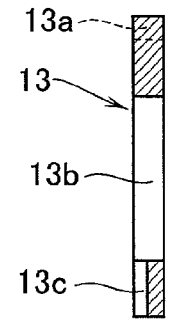
Figure 2C:
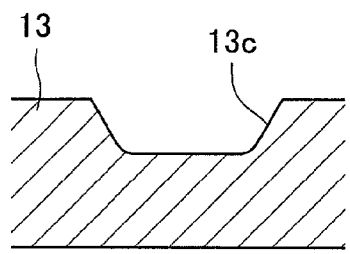

The front cover 5 is formed at its center portion with a punched hole 12, and a thrust bearing 13 having the same outer periphery shape as that of the punched hole 12 is mounted into the punched hole 12. The shape of each of the punched hole 12 and the thrust bearing 13 is circular or noncircular as shown in FIGS. 2A, 2B and 2C. Before the thrust bearing 13 is mounted, a bearing housing 14 comprising a cap 14a and a flange 14b is welded so as to occlude the punched hole 12. That is, an outer periphery of the flange 14b and an outer surface of the front cover 5 are welded to each other, and a diameter of the flange is selected in such a manner the outer periphery of the flange 14b is separated from the punched hole 12 so that the punched hole 12 is not thermally affected at the time of welding.

A plain bearing or rolling bearing 15 is disposed in the cap 14*a*, and an outer periphery of a tip end of the input shaft 3 is supported by the bearing 15. An outer surface of the thrust bearing 13 mounted into the punched hole 12 is supported by an inner surface of the flange 14*b*.

As shown in FIGS. 2A, 2B and 2C, the thrust bearing 13 includes detent projections 13*a*, a shaft-insertion hole 13*b* through which a tip end of the input shaft 3 passes, and oil passages 13*c* formed on the side of receiving surface. The thrust bearing 13 is fitted into the noncircular punched hole 12 of the front cover 5, thereby preventing the thrust bearing 13 from rotating together with the input shaft 3. A thrust applied to the receiving surface from the turbine hub 9 is supported by the flange 14*b*.

Figure 3A:
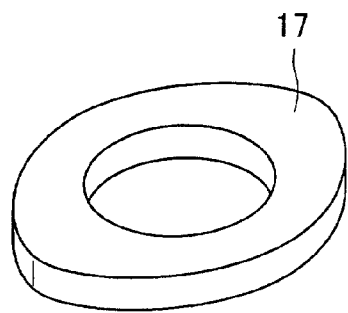
FIGS. 3A and 3B are perspective view of other examples of the thrust bearing.
Figure 3B:
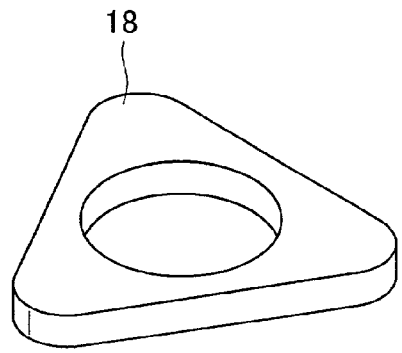
Figure 4:
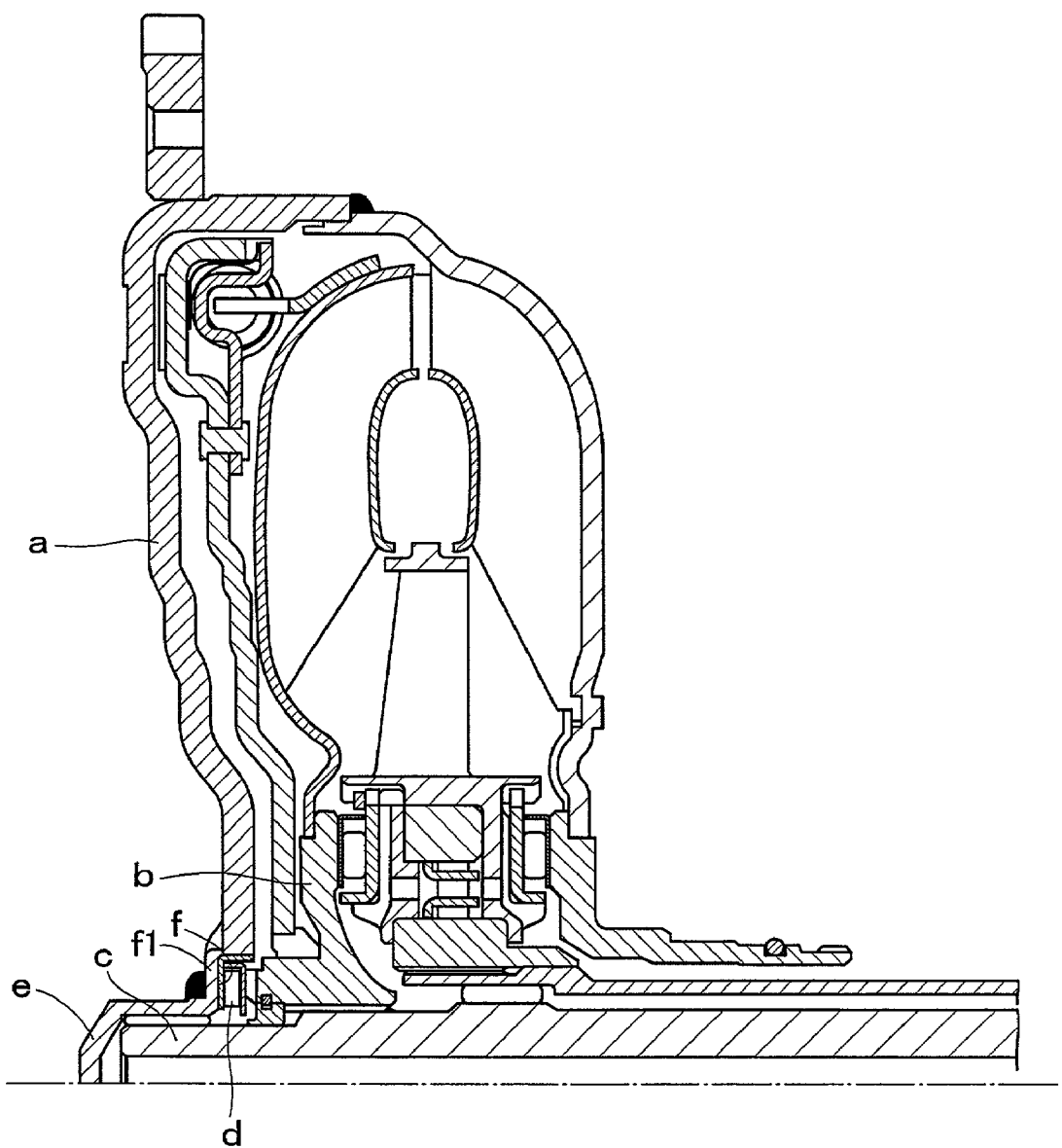
FIG. 4 is a vertical sectional view of a prior art.

The thrust bearing is not limited to the projecting type thrust bearing 13, and an oval thrust bearing 17, a polygonal thrust bearing 18 and the like shown in FIGS. 3A and 3B can be used, and the punched hole conforming to an outer periphery shape of the bearing is opened by the front cover 5. Examples of material used for the thrust bearing are bearing alloy, steel plate, resin and the like.

The inner periphery shape of the punched hole 12 and the outer periphery shape of the thrust bearing 13 are not limited to the noncircular, and the shape may be circular. In this case, it is preferable that both the members are fitted to each other in such a degree that they can not easily rotate relative with each other. A thrust ball bearing, a thrust roller bearing and the like can be used as the thrust bearing 13.

According to the means of the first aspect of the present invention, the thrust bearing is received utilizing the punched hole which was formed by punching the front cover by press, the punched hole is occluded by the welded bearing housing and the thrust is received by the bearing housing and thus, there is effect that it is possible to easily and inexpensively produce a bearing housing having great strength without subjecting the front cover to cutting or thickening press.

According to the means of the second aspect of the invention, the thrust bearing is received utilizing the noncircular punched hole which was formed by punching the front cover by press, the punched hole is occluded by the welded bearing housing and the thrust is received by the bearing housing and thus, there is effect that it is possible to prevent the thrust bearing from relatively rotating, and to easily and inexpensively produce a bearing housing having great strength without subjecting the front cover to cutting or thickening press.

What is claimed is:

1. A thrust receiving structure of a torque converter cover in which an input shaft of an automatic transmission is disposed on a center of a torque converter, a front cover of a converter cover is provided with a thrust bearing, a thrust of a turbine hub fitted to said input shaft is supported by said thrust bearing, wherein a center of said front cover is formed with a punched hole, the punched hole is covered with a bearing housing comprising a cap and a flange, an outer periphery of the flange is welded to an outer surface of the front cover, said thrust bearing provided at its central portion with an insertion hole for the input shaft is fitted into said punched hole, a side surface of said thrust bearing is abutted against an inner surface of said flange, a tip end of said input shaft is inserted into said cap, an end surface of said turbine hub fitted to the input shaft is supported by said thrust bearing, wherein said inner surface of said flange abuts said outer surface of said front cover.

2. A thrust receiving structure of a torque converter cover in which an input shaft of an automatic transmission is disposed on a center of a torque converter, a front cover of a converter cover is provided with a thrust bearing, a thrust of a turbine hub fitted to said input shaft is supported by said thrust bearing, wherein a center of said front cover is formed with a noncircular punched hole, the punched hole is covered with a bearing housing comprising a cap and a flange, an outer periphery of the flange is welded to an outer surface of the front cover, said thrust bearing which is provided at its central portion with an insertion hole for the input shaft and which has noncircular outer periphery is fitted into said punched hole, a side surface of said thrust bearing is abutted against an inner surface of said flange, a tip end of said input shaft is inserted into said cap, an end surface of said turbine hub fitted to the input shaft is supported by said thrust bearing.

3. A thrust receiving structure of a torque converter cover according to claim 1 or 2, wherein a bearing for receiving an outer periphery of the tip end of said input shaft is provided in said cap.

* * * * *